United States Patent [19]

Masina

[11] Patent Number: 5,134,181
[45] Date of Patent: Jul. 28, 1992

[54] POLYETHYLENE STABILIZER COMPOSITIONS COMPRISING COMPOUNDS WITH PIPERIDINE GROUPS AND METAL COMPOUNDS

[75] Inventor: Franca Masina, Anzola Emilia, Italy

[73] Assignee: CIBA-GEIGY Corporation, Ardsley, N.Y.

[21] Appl. No.: 561,220

[22] Filed: Jul. 30, 1990

Related U.S. Application Data

[60] Division of Ser. No. 462,325, Dec. 28, 1989, abandoned, which is a continuation of Ser. No. 187,609, Apr. 28, 1988, abandoned.

[30] Foreign Application Priority Data

May 5, 1987 [IT] Italy .................. 20375 A/87

[51] Int. Cl.$^5$ .................. C08K 5/3492; C08K 5/3435
[52] U.S. Cl. .................. 524/100; 524/101; 524/102; 524/103; 524/282; 524/432; 524/433; 524/436
[58] Field of Search ............... 524/100, 101, 102, 103, 524/282, 432, 433, 436

[56] References Cited

U.S. PATENT DOCUMENTS

| | | | |
|---|---|---|---|
| 4,086,204 | 4/1978 | Cassandrini et al. | 524/101 |
| 4,104,248 | 8/1978 | Cantatore | 524/103 |
| 4,256,627 | 3/1981 | Moser et al. | 524/100 |
| 4,288,593 | 9/1981 | Rody | 544/198 |
| 4,315,859 | 2/1982 | Nikles | 524/100 |
| 4,331,586 | 5/1982 | Hardy | 524/97 |
| 4,533,688 | 8/1985 | Toda et al. | 524/100 |
| 4,540,728 | 9/1985 | Nakahara et al. | 524/100 |

FOREIGN PATENT DOCUMENTS 2132621  7/1984  United Kingdom.

OTHER PUBLICATIONS

Abstract of Japan, vol. 11, No. 124 (1987).
Dainippon Ink Chem. JP-108268.

*Primary Examiner*—Kriellion S. Morgan
*Attorney, Agent, or Firm*—Luthr A. R. Hull

[57] ABSTRACT

A polyethylene stabilizer composition comprises:
A) one or more compounds with piperidine groups of the formula (I) or (Ia)

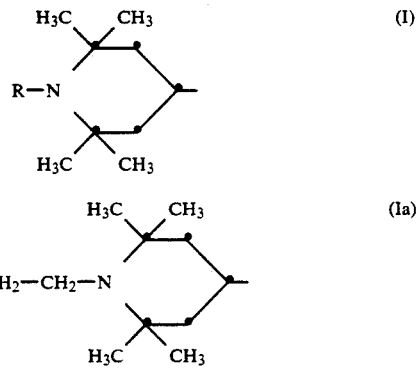

in which R is hydrogen, $C_1$-$C_4$-alkyl, allyl, benzyl, acetyl, acryloyl, 2-hydroxyethyl or 2-hydroxypropyl and
B) one or more metal compounds such as oxides and hydroxides of Al, Mg and Zn and, if appropriate, one or more salts of Al, Ba, Ca, Mg, Sr and Zn with $C_1$-$C_{22}$-carboxylic acids.

20 Claims, No Drawings

POLYETHYLENE STABILIZER COMPOSITIONS COMPRISING COMPOUNDS WITH PIPERIDINE GROUPS AND METAL COMPOUNDS

This application is a continuation of application Ser. No. 462,325, filed Dec. 28, 1989 now abandoned, which is a continuation of Ser. No. 187,609 filed Apr. 28, 1988, now abandoned.

The present invention relates to a novel method for stabilizing polyethylene against photoxidative degradation by using mixtures of 2,2,6,6-tetramethylpiperidine derivatives and particular metal compounds.

Polyethylene is here to be understood as meaning linear or branched polymers of ethylene of low, medium and high density, their mixtures in any proportions and also ethylene copolymers with aliphatic $C_3$–$C_{12}$-α-olefines containing up to 20% of di-α-olefine.

Of particular interest are branched low-density polyethylene, generally known as LDPE, and linear low-density polyethylene, generally designated as LLDPE, and their mixtures in any proportion.

It is known that polyethylene undergoes a progressive decrease in mechanical strength up to embrittlement when it is exposed to sunlight, as a result of photooxidative degradation caused by ultraviolet radiation.

To overcome this drawback it is necessary to add to the polymer suitable light stabilizers, for example certain derivatives of benzophenone and benzotriazole, nickel complexes, esters of substituted benzoic acids or sterically hindered amines.

Certain 2,2,6,6-tetramethylpiperidine derivatives of relatively high molecular weight have recently shown remarkable efficacy; nevertheless, the results obtained with these compounds have not been completely satisfactory, so that a further improvement was desirable.

It has now been found surprisingly that, when particular mixtures of one or more 2,2,6,6-tetramethylpiperidine derivatives with one or more metal compounds are used, light stability values are obtained which are significantly higher than those given by the use of piperidine compounds alone.

In particular, the present invention relates to a novel method for stabilizing polyethylene, which comprises the use of synergistic mixtures composed of (A) one or more compounds with groups of the formula (I) or (Ia)

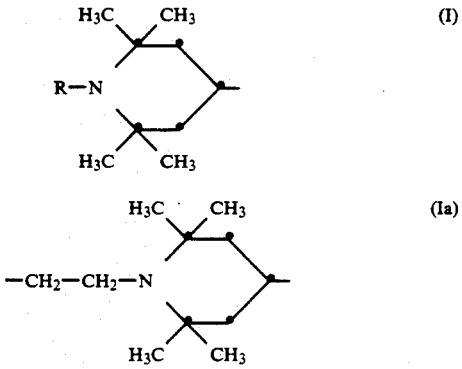

in which is hydrogen, $C_1$–$C_4$-alkyl, allyl, benzyl, acetyl, acryloyl, 2-hydroxyethyl or 2-hydroxypropyl, preferably hydrogen or methyl, and (B) one or more metal compounds comprising oxides and hydroxides of Al, Mg and Zn, preferably Mg and Zn.

If appropriate, the following can be added to the mixtures of (A)+(B):

(C) one or more salts of Al, Ba, Ca, Mg, Sr and Zn with $C_1$–$C_{22}$-carboxylic acids, preferably the salts of Al, Ca, Mg or Zn with $C_{12}$–$C_{18}$-carboxylic acids. The use of certain 2,2,6,6-tetramethylpiperidine derivatives mixed with oxides or hydroxides of Mg or Zn as stabilizers for polymers was already known, but was restricted to the stabilization of polyurethanes.

In particular, Japanese Patent 82-34,155, published on 24.2.1982, claims the stabilization of polyurethanes with mixtures comprising esters of 2,2,6,6-tetramethyl-4-piperidinol, oxides or hydroxides of Mg or Zn and organic phosphites. The said mixtures do not give satisfactory results when used for stabilizing polyethylene.

On the other hand, British Patent 2,132,621 describes the use of mixtures of zinc oxide and esters of 2,2,6,6-tetramethyl-4-piperidinol as photodegrading agents for polyolefines, in particular polyethylene and polypropylene.

The synergistic stabilizing effect, obtained with the mixtures of the present invention, on polyethylene is therefore surprising.

Compounds (A) which contain the group of the formula (I) or (Ia) and can be used according to the present invention are:

(A1) The compounds claimed in U.S. Pat. No. 4,086,204, preferably those of the formula (II)

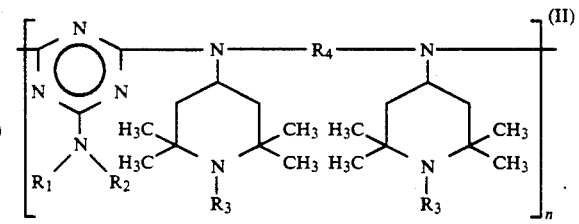

in which $R_1$ is $C_1$–$C_8$-alkyl, cyclohexyl, 2,2,6,6-tetramethyl-4-piperidyl or 1,2,2,6,6-pentamethyl-4-piperidyl, $R_2$ is hydrogen or $C_1$–$C_8$-alkyl, $R_3$ is hydrogen or methyl, $R_4$ is $C_2$–$C_6$-alkylene and n is a number from 2 to 20;

(A2) The compounds claimed in U.S. Pat. No. 4,104,248, preferably those of the formula (III)

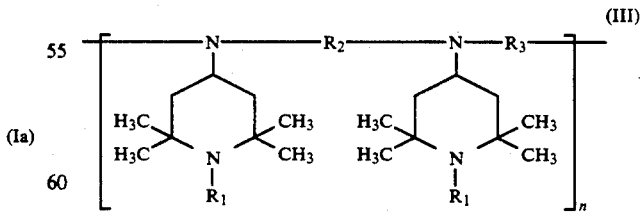

in which $R_1$ is hydrogen or methyl, $R_2$ is $C_2$–$C_6$-alkylene, $R_3$ is $C_2$–$C_6$-alkylene, 2-hydroxytrimethylene or xylylene and n is a number from 2 to 20;

(A3) The compounds claimed in U.S. Pat. Nos. 4,108,829 and 4,263,434, preferably those of the formula (IV)

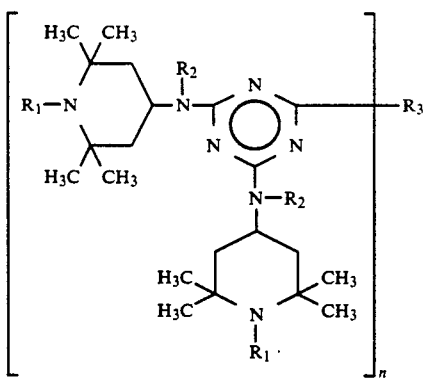

(IV)

in which $R_1$ is hydrogen or methyl, $R_2$ is hydrogen, $C_1$–$C_8$-alkyl, cyclohexyl, 2,2,6,6-tetramethyl-4-piperidyl or 1,2,2,6,6-pentamethyl-4-piperidyl, n is 2, 3 or 4 and $R_3$ is the radical of an n-valent polyamine;

(A4) The compounds claimed in U.S. Pat. No. 4,233,412, preferably those of the formula (V)

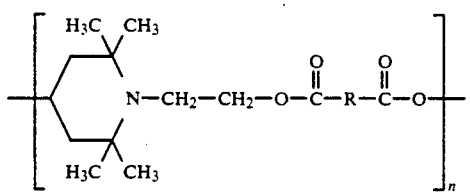

(V)

in which R is $C_2$–$C_8$-alkylene and n is a number from 2 to 30;

(A5) The compounds of the formula (VI)

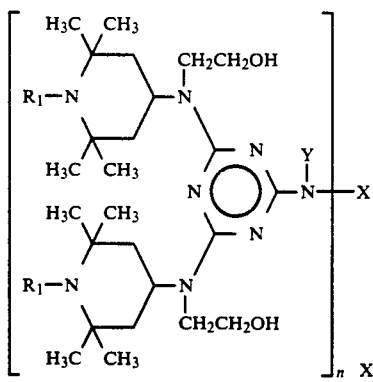

(VI)

in which $R_1$ is hydrogen or methyl, n is 1 or 2, with n=1 X is $C_1$–$C_{12}$-alkyl, benzyl or —CH$_2$CH$_2$OH and Y is hydrogen or a group

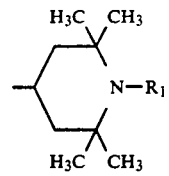

and with n=2 X is $C_2$–$C_6$-alkylene, xylylene or a group

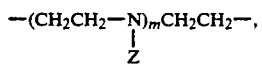

$—(CH_2CH_2—N)_mCH_2CH_2—,$
            |
            Z where m is 1 or 2 and Z is a group of the formula

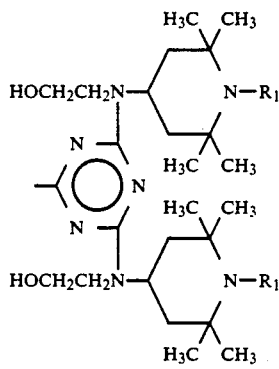

and Y is hydrogen or a group

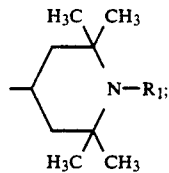

(A6) The compounds of the formula (VII)

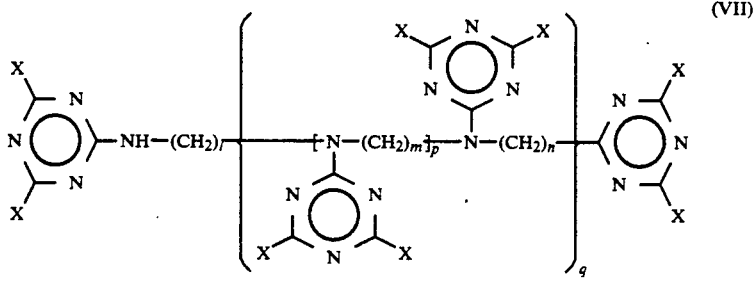

(VII)

in which l, m, n are 2 or 3, p and q are zero or 1 and X is a group

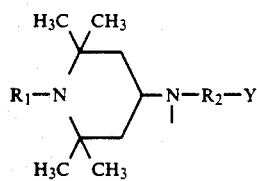

where $R_1$ is hydrogen or methyl, $R_2$ is $C_2$–$C_3$-alkylene and Y is OH, $C_1$–$C_8$-alkoxy, dimethylamine or diethylamino;

(A7) The compounds claimed in U.S. Pat. No. 4,288,593, preferably those of the formula (VIII)

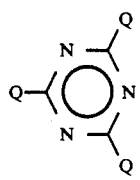
(VIII)

in which Q is a group of the formula

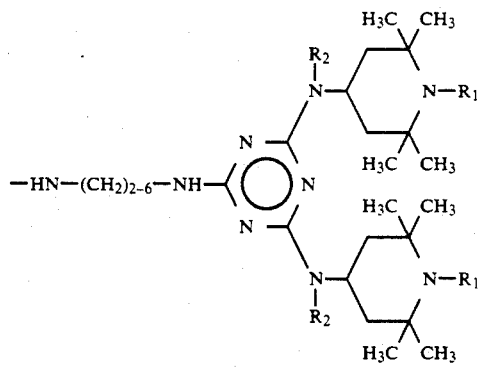

or a group of the formula

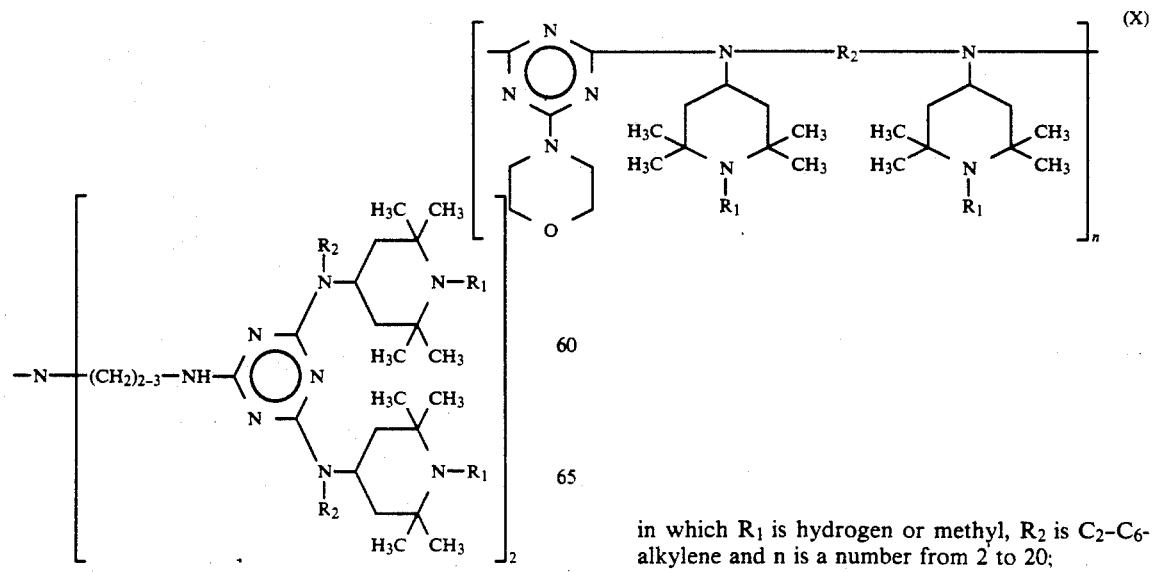

where $R_1$ is hydrogen or methyl and $R_2$ is $_1$–$C_8$-alkyl;

(A8) The compounds claimed in U.S. Pat. No. 4,315,859, preferably those of the formula (IX)

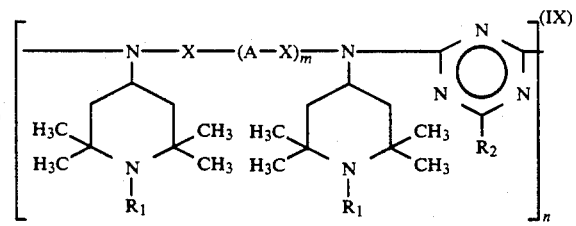

in which $R_1$ is hydrogen or methyl, X is $C_2$–$C_6$-alkylene, A is —O—, —NH— or

m is 1 or 2, $R_2$ is morpholino, hexamethyleneimino, —$OR_3$ or

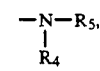

where $R_3$ is $C_1$–$C_8$-alkyl allyl, cyclohexyl, phenyl or benzyl and $R_4$ and $R_5$ which can be identical or different are $C_1$–$C_8$-alkyl which may be interrupted by an oxygen atom, allyl, cyclohexyl, 2-hydroxyethyl, benzyl or a group

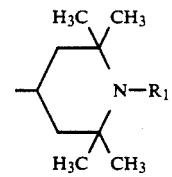

and $R_5$ can also be hydrogen;

(A9) The compounds claimed in U.S. Pat. No. 4,331,586, preferably those of the formula (X)

in which $R_1$ is hydrogen or methyl, $R_2$ is $C_2$–$C_6$-alkylene and n is a number from 2 to 20;

(A10) The compounds of the formula (XI)

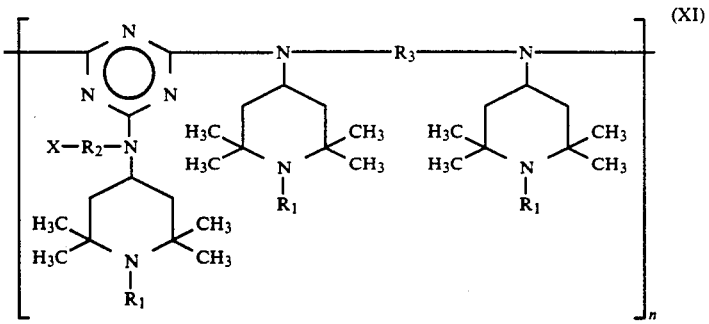

in which $R_1$ is hydrogen or methyl, $R_2$ is $C_2$-$C_3$alkylene, X is $C_1$-$C_8$-alkoxy, dimethylamino or diethylamino, $R_3$ is $C_2$-$C_6$-alkylene and n is a number from 2 to 20;

(A11) The compounds of the formula (XII)

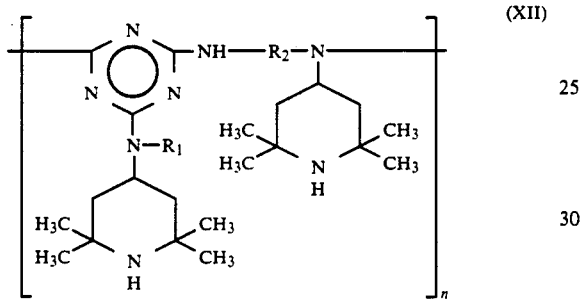

in which $R_1$ is $C_1$-$C_8$-alkyl, $C_5$-$C_9$-cycloalkyl, ($C_1$-$C_4$)-alkoxy propyl, dimethylaminopropyl or diethylaminopropyl, $R_2$ is $C_2$-$C_6$-alkylene and n is a number from 2 to 20;

(A12) The compounds of the formula (XIII)

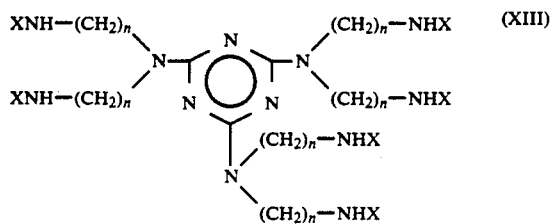

in which n is 2 or 3 and X is a group of the formula

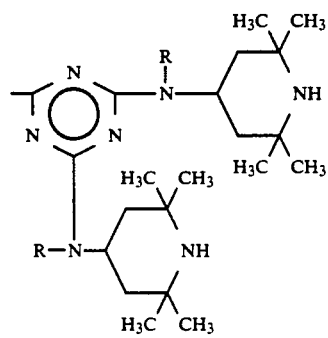

where R is hydrogen, $C_1$-$C_8$-alkyl, $C_2$-$C_4$-alkyl substituted by $C_1$-$C_4$-alkoxy or by di($C_1$-$C_4$-alkyl)amino, or is cyclohexyl;

(A13) The compounds of the formula (XIV)

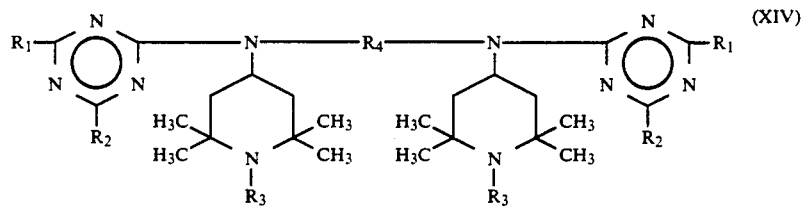

in which $R_1$ is allyloxy, allylamino or diallylamino, $R_2$ is $C_1$-$C_4$-alkoxy, allyloxy, allylamino, diallylamino, $C_1$-$C_8$-alkylamino, $C_2$-$C_8$-dialkylamino, morpholino or a group

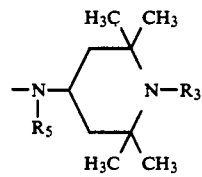

$R_3$ is hydrogen or methyl, $R_5$ is hydrogen, $C_1$-$C_8$-alkyl or a group

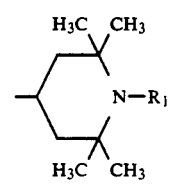

and $R_4$ is $C_2-C_6$-alkylene;

(A14) The polymers claimed in U.S. Pat. Nos. 4,413,093 and 4,435,555, obtained from compounds of the formula (XIV);

(A15) The compounds of the formula (XV)

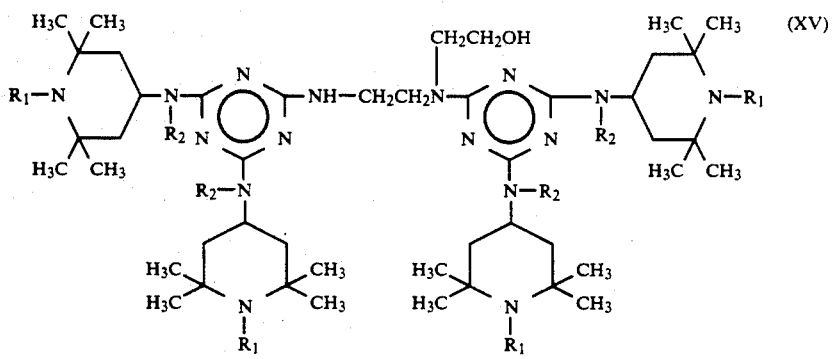

(XV)

in which $R_1$ is hydrogen or methyl, $R_2$ is hydrogen, $C_1-C_8$-alkyl, $(C_1-C_4)$-alkoxypropyl, dimethylaminopropyl, diethylaminopropyl, cyclohexyl or a group

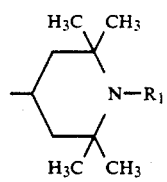

(A16) The compounds of the formula (XVI) and (XVII)

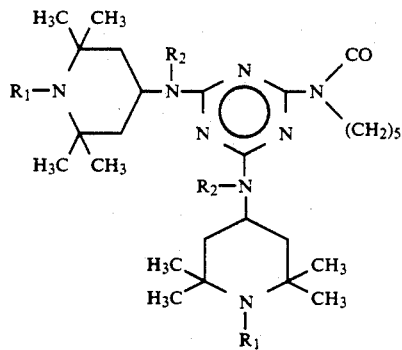

(XVI)

in which $R_1$ is hydrogen or methyl, $R_2$ is hydrogen, $C_1-C_8$-alkyl, cyclohexyl, $C_2-C_4$-alkyl substituted by OH, $C_1-C_4$-alkoxy, dimethylamino or diethylamino, and n is a number from 2 to 6;

(A17) The compounds of the formula (XVIII)

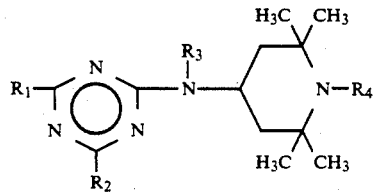

(XVIII)

in which $R_1$ is allyloxy, allylamino or diallylamino, $R_2$ is the same as $R_1$ or is $C_1-C_8$-alkylamino, di($C_1-C_4$-alkyl)-amino, morpholino or a group

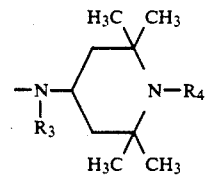

$R_3$ is hydrogen, $C_1-C_8$-alkyl or a group

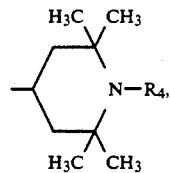

and $R_4$ is hydrogen or methyl;

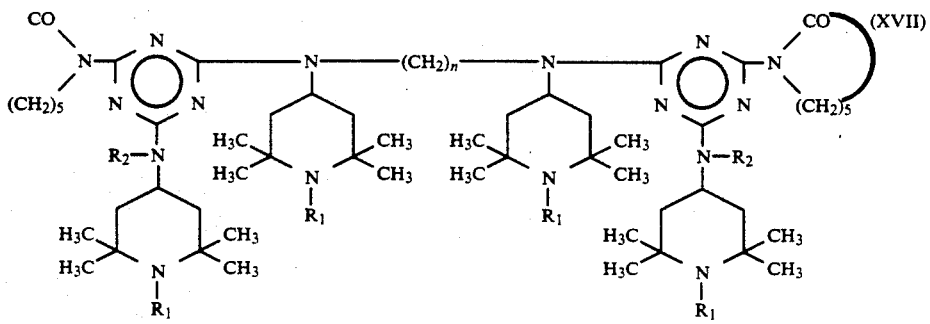

(XVII)

(A18) The compounds of the formula (XIX) and (XX)

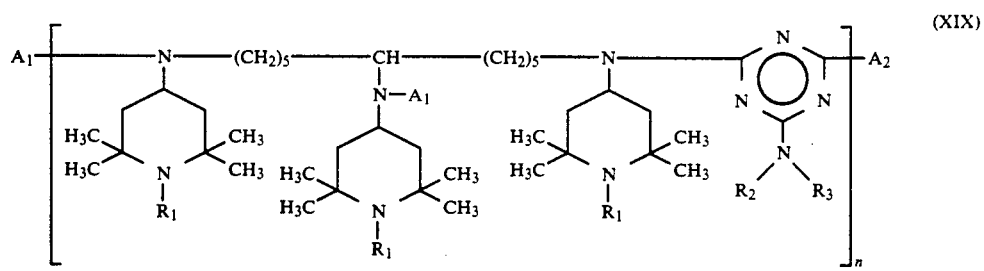
(XIX)
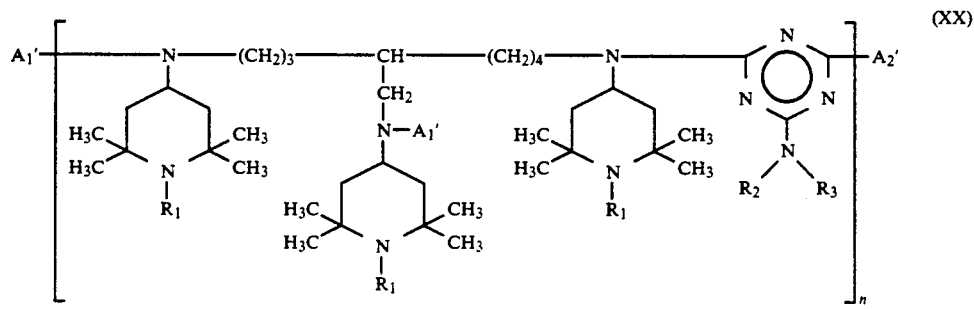
(XX)
in which n is a number from 1 to 10, $R_1$ is hydrogen or methyl, $R_2$ and $R_3$ which can be identical or different are $C_1-C_8$-alkyl or a group
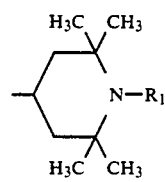
$A_1$ and $A'_1$ are hydrogen or a group
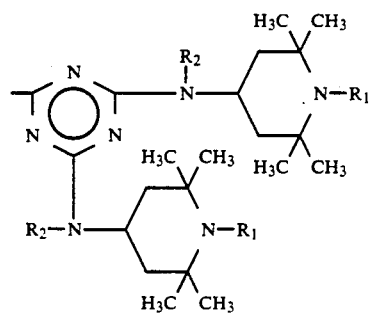
and $A_2$ and $A'_2$ are a group
or $A_2$ is a group
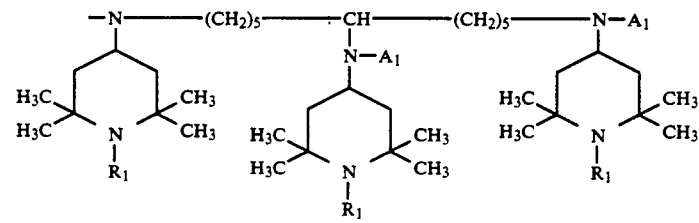
and $A'_2$ is a group

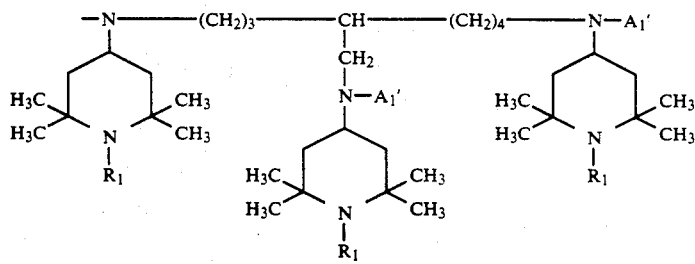

(A19) The compounds of the formula (XXI)

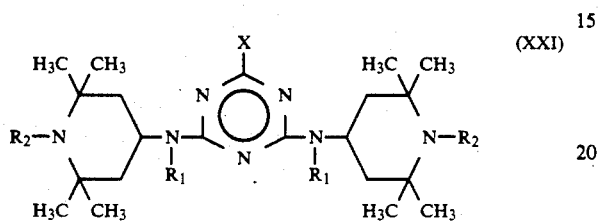 (XXI)

in which $R_1$ is $C_1$–$C_8$-alkyl, cyclohexyl, benzyl or $C_2$–$C_4$-alkyl substituted by $C_1$–$C_4$-alkoxy or dimethylamino or diethylamino, $R_2$ is hydrogen or methyl, X is morpholino or a group

—$OR_5$ or a group

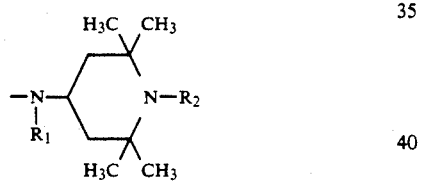

where $R_3$ and $R_4$ which can be identical or different are $C_1$–$C_8$-alkyl, cyclohexyl, benzyl or $C_2$–$C_4$-alkyl substituted by OH, $C_1$–$C_4$-alkoxy, dimethylamino or diethylamino, $R_4$ can also be hydrogen and $R_5$ is $C_1$–$C_8$-alkyl, allyl, cyclohexyl or benzyl;

(A20) The compounds claimed in U.S. Pat. No. 4,477,615, preferably those of the formula (XXII)

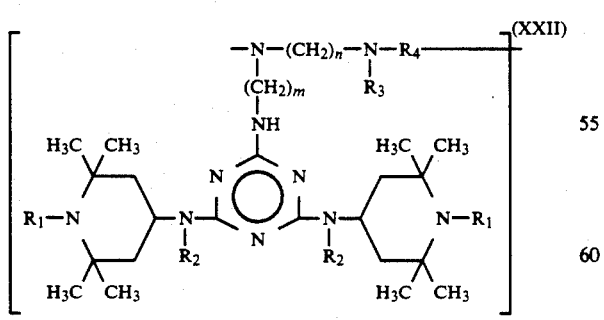

in which m and n which can be identical or different are numbers from 2 to 6, p is a number from 2 to 20, $R_1$ is hydrogen or methyl, $R_2$ is hydrogen, $C_1$–$C_8$-alkyl, cyclohexyl or benzyl, $R_3$ is hydrogen or a group of the formula

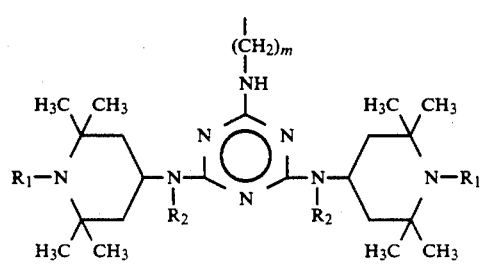

$R_4$ is $C_2$–$C_6$-alkylene, xylene, 2-hydroxytrimethylene or a group of the formula

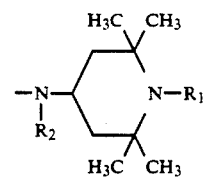

where $R_5$ is $C_1$–$C_8$-alkylamino, di($C_1$–$C_4$-alkyl)amino, cyclohexylamino, morpholino or a group

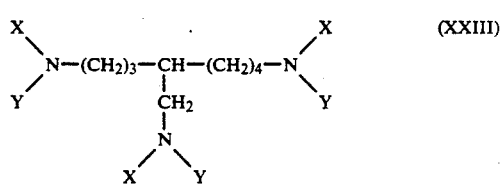

(A21) The compounds claimed in U.S. Pat. No. 4,533,688, preferably those of the formula (XXIII)

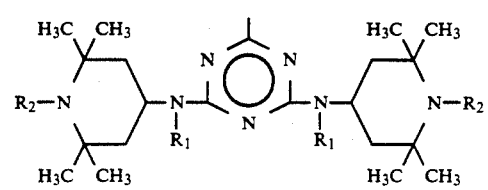 (XXIII)

in which X is a group of the formula

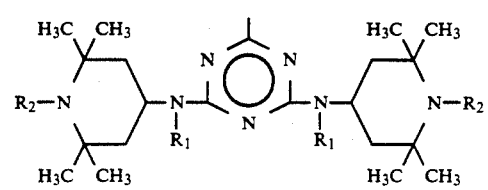

where $R_1$ is hydrogen, $C_1$-$C_8$-alkyl, $C_3$-$C_8$-alkoxyalkyl, benzyl or a group

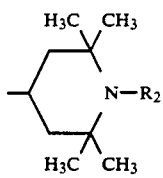

$R_2$ is hydrogen or methyl and Y is a hydrogen or a group

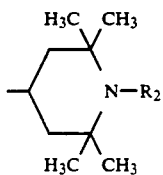

(A22) The compounds claimed in U.S. Pat. No. 4,540,728, preferably those of the formula (XXIV)

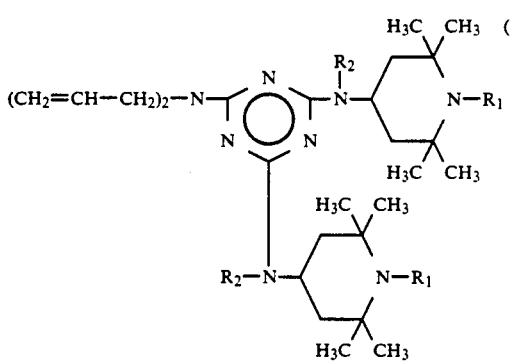

in which $R_1$ is hydrogen or methyl and $R_2$ is hydrogen or $C_1$-$C_8$ alkyl, and also the corresponding polymers of the molecular weight between 800 and 5,000;

(A23) The compounds of the formula (XXV)

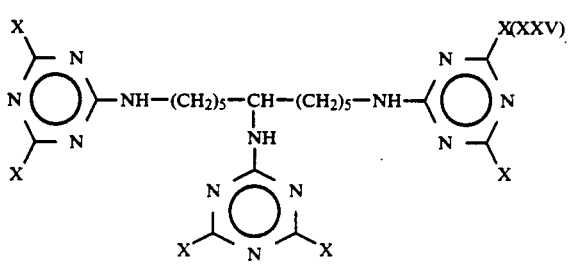

in which X is a group

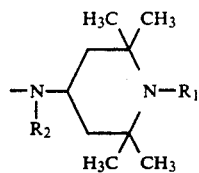

where $R_1$ is hydrogen or methyl and $R_2$ is hydrogen or $C_1$-$C_8$-alkyl.

Preferred compounds (A) are those of the formulae (II), (III), (IV), (V), (X) and (XXI).

Particularly preferred compounds (A) are those of the formula (II) in which $R_1$ is $C_2$-$C_8$-alkyl or cyclohexyl, $R_2$ is hydrogen or $C_2$-$C_2$-$C_8$-alkyl is hydrogen or methyl, $R_4$ is $-(CH_2)_{2-6}$ and n is a number from 2 to 10, those of the formula (III) in which $R_1$ is hydrogen or methyl, $R_2$ is $-(CH_2)_6-$, $R_3$ is $-(CH_2)_{2-6}$ and n is a number from 2 to 10, those of the formula (IV) in which $R_1$ is hydrogen or methyl, $R_2$ is $C_1$-$C_4$-alkyl, n is 2, 3 or 4 and $R_3$ is a group of the formula $-NH(CH_2)_{2-6}NH-$ for $n=2$,

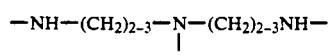

for $n=3$ and

for $n=4$, those of the formula (V) in which R is $-(CH_2)_{2-6}$ and n is a number from 2 to 20, those of the formula (X) in which $R_1$ is hydrogen or methyl, $R_2$ is $-(CH_2)_{2-6}-$ and n is a number from 2 to 10, and those of the formula (XXI) in which $R_1$ is $C_1$-$C_8$-alkyl, $R_2$ is hydrogen or methyl and X is a group

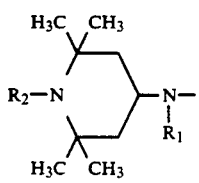

Compounds (A) of particular interest are:

COMPOUND 1
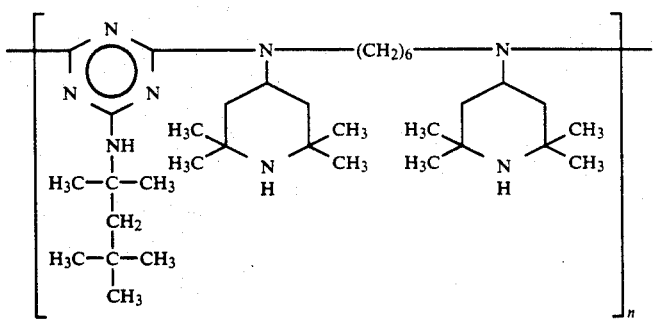
COMPOUND 2
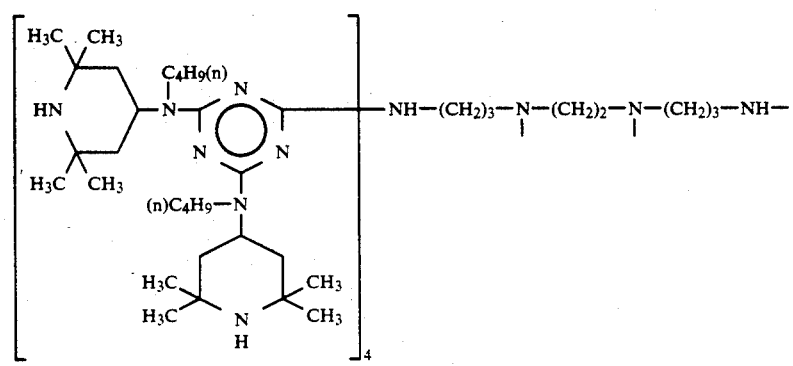
COMPOUND 3
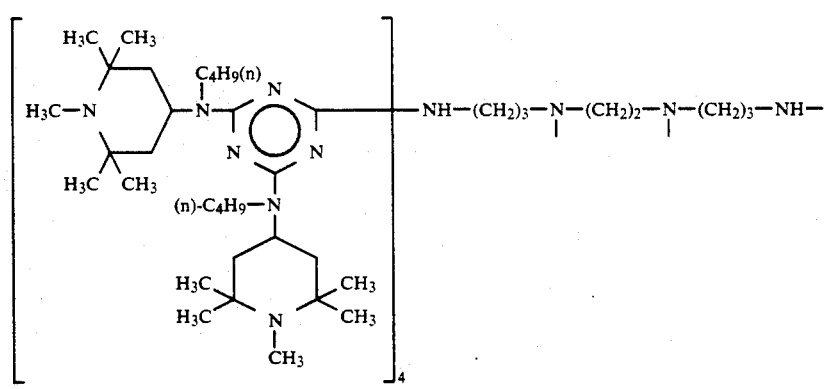
COMPOUND 4
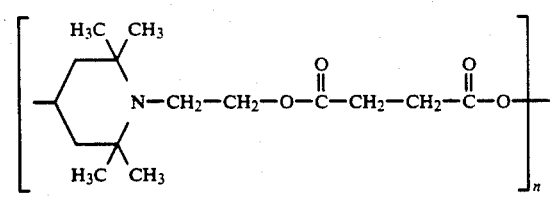
COMPOUND 5
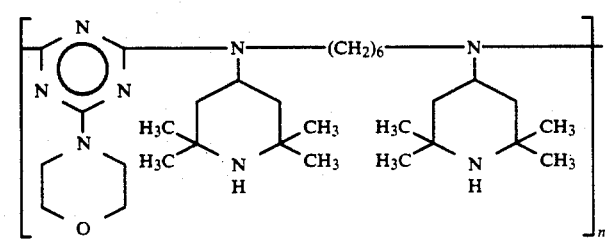

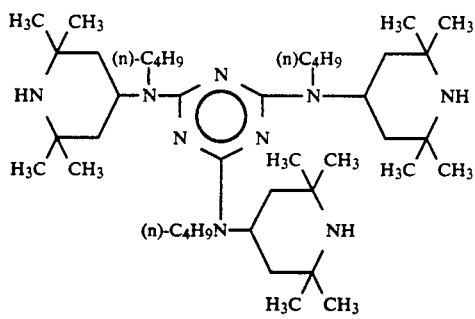

COMPOUND 6

The said compounds can be used by themselves or as a mixture with one another.

Compounds (B) which can be used according to the present invention are preferably the oxides and hydroxides of Mg and Zn.

The oxides of Mg and Zn are particularly preferred, and they can be used by themselves or as a mixture with one another.

The compounds (C) which can be used according to the present invention, if desired, are preferably salts of Al, Ca, Mg and Zn with $C_{12}-C_{18}$-carboxylic acids.

The stearates of Ca, Mg and Zn, which can be used by themselves or as a mixture with one another, are particularly preferred.

The percentages by weight, relative to the weight of the polyethylene, of compounds (A), (B) and (C) are: 0.025 to 2%, preferably 0.05 to 1%, for compounds (A), 0.005 to 1%, preferably 0.025 to 0.5%, for compounds (B) and 0.005 to 1%, preferably 0.025 to 0.5%, for compounds (C).

The compounds (A), (B) and (C) can be mixed with one another before they are added to the polymer, or they can be added separately to the polymer, using any one of the known processes.

If desired, other additives conventional for polyethylene, such as phenolic antioxidants, phosphites, UV absorbers and other types of light stabilizers, can be added to the compounds (A), (B) and (C) of the present invention.

Examples of additives which can be mixed with the compounds (A) (B) and (C) are:

Phenolic antioxidants from the following classes:

Alkylated monophenols, for example 2,6-di-t-butyl-4-methylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-di-cyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol and 2,6-dinonyl-4-methylphenol.

Alkylated hydroquinones, for example 2,6-di-t-butyl-4-methoxyphenol, 2,5-di-t-butylhydroquinone, 2,5-di-t-amylhydroquinone and 2,6-diphenyl-4-octadecyloxyphenol.

Thiobisphenols, for example 2,2'-thio-bis-(6-t-butyl-4-methylphenol), 2,2'-thio-bis-(4-octylphenol), 4,4'-thio-bis-(6-t-butyl-3-methylphenol) and 4,4'-thio-bis-(6-t-butyl-2-methylphenol).

Alkylidene-bisphenols, for example 2,2'-methylene-bis-(6-t-butyl-4-methylphenol), 2,2'-methylene-bis-(6-t-butyl-4-ethylphenol), 2,2'-methylene-bis-[4-methyl-6-(α-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-di-t-butylphenol), 2,2'-ethylidene-bis-(4,6-di-t-butylphenol), 2,2'-ethylidene-bis-(6-t-butyl-4-isobutylphenol), 2,2'-methylene-bis-[6-(α-methylbenzyl)-4-nonylphenol], 2,2'-methylene-bis-[6-(α,α-dimethylbenzyl)-4-nonylphenol], 4,4'-methylene-bis-(2,6-di-t-butylphenol), 4,4'-methylene-bis-(6-t-butyl-2-methylphenol), 1,1-bis-(5-t-butyl-4-hydroxy-2-methylphenyl)-butane, 2,6-bis-(3-t-butyl-5-methyl-2-hydroxybenzyl)-4-methylphenol, 1,1,3-tris-(5-t-butyl-4-hydroxy-2-methylphenyl)butane, 1,1-bis-(5-t-butyl-4-hydroxy-2-methylphenyl)-3-n-dodecylmercaptobutane, ethylene glycol bis-[3,3-bis-(3'-t-butyl-4'-hydroxyphenyl)-butyrate], bis-(3-t-butyl-4-hydroxy-5-methylphenyl)-dicyclopentadiene and bis-[2-(3'-t-butyl-2'-hydroxy-5'-methylbenzyl)-6-t-butyl-4-methylphenyl] terephthalate.

Benzyl compounds, for example 1,3,5-tris-(3,5-di-t-butyl-4-hydroxybenzyl)-2,4,6-trimethylbenzene, bis-(3,5-di-t-butyl-4-hydroxybenzyl) sulfide, isooctyl 3,5-di-t-butyl-4-hydroxybenzyl-mercaptoacetate, bis-(4-t-butyl-3-hydroxy-2,6-dimethylbenzyl) dithiolterephthalate, 1,3,5-tris-(3,5-di-t-buty-4-hydroxy-benzyl) isocyanurate, 1,3,5-tris-(4-t-butyl-3-hydroxy-2,6-dimethylbenzyl) isocyanurate, dioctadecyl 3,5-di-t-butyl-4-hydroxybenzylphosphonate, calcium monoethyl 3,5-di-t-butyl-4-hydroxybenzylphosphonate and 1,3,5-tris-(3,5-dicyclohexyl-4-hydroxybenzyl) isocyanurate.

Acylaminophenols, for example lauric acid 4-hydroxyanilide, stearic acid 4-hydroxyanilide, 2,4-bis-(octylmercapto)-6-(3,5-di-t-butyl-4-hydroxyanilino)-s-triazine and octyl N-(3,5-di-t-butyl-4-hydroxyphenyl)-carbamate.

Esters of β-(3,5-di-t-butyl-4-hydroxyphenyl)-propionic acid with monohydric or polyhydric alcohols, for example methanol, diethylene glycol, octadecanol, triethylene glycol, 1,6-hexanediol, pentaerythritol, neopentyl glycol, tris-(hydroxyethyl) isocyanurate, thiodiethylene glycol and N,N'-bis-(hydroxyethyl)-oxamide.

Esters of β-(5-t-butyl-4-hydroxy-3-methylphenyl)-propionic acid with monohydric or polyhydric alcohols, for example methanol, diethylene glycol, octadecanol, triethylene glycol, 1,6-hexanediol, pentaerythritol, neopentyl glycol, tris(hydroxyethyl) isocyanurate, thiodiethylene glycol and N,N'-bis-(hydroxyethyl)-oxamide.

Esters of β-(3,5-dicyclohexyl-4-hydroxyphenyl)-propionic acid with monohydric or polyhydric alcohols, for example methanol, diethylene glycol,.octadecanol, triethylene glycol, 1,6-hexanediol, pentaerythritol, neopentyl glycol, tris-(hydroxyethyl) isocyanurate, thiodiethylene glycol and N,N'-bis-(hydroxyethyl)-oxamide.

Amides of β-(3,5-di-t-butyl-4-hydroxyphenyl)-propionic acid, for example N,N'-bis-(3,5-di-t-butyl-4-hydroxyphenylpropionyl)-hexamethylenediamine, N,N'-bis-(3,5-di-t-butyl-4-hydroxy-phenylpropionyl)-trimethylenediamine and N,N'-bis-(3,5-di-t-butyl-4-hydroxyphenylpropionyl)-hydrazine.

UV absorbers and light stabilizers 2-(2'-Hydroxyphenyl)-benzotriazoles, for example the 5'-methyl, 3',5'-di-t-butyl, 5'-t-butyl, 5'-(1,1,3,3-tetramethylbutyl), butyl), 5-chloro-3',5'-di-t-butyl, 5-chloro-3'-t-butyl-5'-methyl, 3'-sec.-butyl-5'-t-butyl, 4'-octoxy-3',5'-di-t-amyl and 3',5'-bis-(α,α-dimethylbenzyl) derivatives.

2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

Esters of various substituted benzoic acids, for example 4-t-butylphenyl salicylate, phenyl salicylate, octylphenyl salicylate, dibenzoylresorcinol, bis-(4-t-butylbenzoyl)-resorcinol, benzoylresorcinol, 2,4-di-t-butylphenyl 3,5-di-t-butyl-4-hydroxybenzoate and hexadecyl 3,5-di-t-butyl-4-hydroxybenzoate.

Acrylates, for example ethyl α-cyano-β,β-diphenylacrylate, isoctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(8-carbomethoxy-8-cyanovinyl)-2-methylindoline.

Nickel compounds, for example nickel complexes of 2,2'-thio-bis-[4-(1,1,3,3-tetramethylbutyl)-phenol], such as the 1:1 or 1:2 complexes, which may contain additional ligands such as n-butylamine, triethanolamine or N-cyclohexyldiethanolamine, nickel dibutyldithiocarbamate, nickel salts of monoalkyl esters of 4-hydroxy-3,5-di-t-butylbenzylphosphonic acid, such as the methyl or ethyl esters, nickel complexes of ketoximes such as 2-hydroxy-4-methylphenyl undecyl ketoxime and nickel complexes of 1-phenyl-4-lauroyl-5-hydroxypyrazole, with or without additional ligands.

Oxalic acid diamides, for example 4,4'-dioctyloxyoxanilide, 2,2'-dioctyloxy-5,5'-di-t-butyloxanilide, 2,2'-didodecyloxy-5,5'-di-t-butyloxanilide, 2-ethoxy-2'-ethyloxanilide, N,N'-bis-(3-dimethylaminopropyl)-oxamide, 2-ethoxy-5-t-butyl-2'-ethyloxanilide and its mixtures with 2-ethoxy-2'-ethyl-5,4'-di-t-butyloxanilide, and mixtures of ortho- and paramethoxy- and also o- and p-ethoxy-disubstituted oxanilides.

Phosphites and phosphonites, for example triphenyl phosphite, diphenyl alkyl phosphites, phenyl dialkyl phosphites, tris-(nonylphenyl) phosphite, trilauryl phosphite, trioctadecyl phosphite, distearyl pentaerythritol diphosphite, tris-(2,4-di-t-butylphenyl) phosphite, diisodecyl pentaerythritol diphosphite, bis-(2,4-di-t-butylphenyl) pentaerythritol diphosphite, tristearyl sorbitol triphosphite, tetrakis-(2,4-di-t-butylphenyl) 4,4'-diphenylenediphosphonite and 3,9-bis-(2,4-di-t-butylphenoxy)-2,4,8,10-tetraoxa-3,9-diphosphaspiro[5.5]undecane.

The use of the stabilizer mixtures according to the present invention is illustrated by the examples which follow; these are given by way of illustration only and do not imply any restriction.

EXAMPLES 1-10

10 kg of low-density polyethylene powder of melt index 0.6 (Fertene EF 3-2000, a product from Soc. Enichem Polimeri) are mixed in a slow mixer with the compounds indicated in Table 1.

The mixtures are then extruded at a temperature of 190° C. and converted into granules, from which stretched films of 150 um thickness are obtained by blow extrusion using a Dolci pilot extruder (screw diameter=45/26 D and head diameter=100 mm) under the following working conditions:

body temperature=170-190-200° C.
head temperature=200—200—200 -190° C.

The films obtained are exposed outdoors at 45°, facing south, on pinewood at Pontecchio Marconi (Bologna) (about 110 kly/year). The residual elongation is measured on samples, taken after various times of exposure by means of a constant-speed tensometer.

The energy received (expressed in kilolangleys) needed to halve the initial elongation value is then calculated ($T_{50}$).

The results obtained are shown in Table 1.

TABLE 1

| Example No. | Compound A (g) | Compound B (g) | Compound C (g) | $T_{50}$ elongation (kly) |
|---|---|---|---|---|
| 1 | Compound 1 (20) | — | — | 117 |
| 2 | Compound 1 (20) | MgO (10) | — | 168 |
| 3 | Compound 1 (20) | ZnO (10) | — | 138 |
| 4 | Compound 1 (20) | MgO (10) | Ca stearate (10) | 193 |
| 5 | Compound 1 (20) | ZnO (10) | Ca stearate (10) | 161 |
| 6 | Compound 2 (20) | — | — | 128 |
| 7 | Compound 2 (20) | MgO (10) | — | 175 |
| 8 | Compound 2 (20) | ZnO (10) | — | 154 |
| 9 | Compound 2 (20) | MgO (10) | Ca stearate (10) | 192 |
| 10 | Compound 2 (20) | ZnO (10) | Ca stearate (10) | 186 |

EXAMPLES 11-18

10 kg of low-density polethylene powder of melt index 0.1 (Fertene EF 3-2000, a product from Soc. ENICHEM POLIMERI) are mixed in a slow mixer with the compounds indicated in Table 2.

The mixtures are then extruded at a temperature of 190° C. and converted into granules, from which stretched films of 150 μm thickness are obtained by blow extrusion using a Dolci pilot extruder (screw diameter=45/26D and head diameter =100 mm) under the following working conditions:

body temperature=170-190-200° C.
head temperature=200—200—200—190° C.

The films obtained are exposed in a model 65 WR Weather - 0 -meter (ASTM G26 -77) with a black panel temperature of 63° C. The residual elongation is measured on samples, taken after various times of exposure to light, by means of a constant speed tensometer; the exposure time in hours ($T_{50}$) needed to halve the initial elongation value is then calculated. The results obtained are shown in Table 2:

TABLE 2

| Example No. | Compound A (g) | Compound B (g) | Compound C (g) | $T_{50}$ (hours) |
|---|---|---|---|---|
| 11 | compound 1 (10) | — | — | 3900 |
| 12 | compound 1 (10) | ZnO (5) | Ca stearate (5) | >4500 |

TABLE 2-continued

| Example No. | Compound A (g) | Compound B (g) | Compound C (g) | T50 (hours) |
|---|---|---|---|---|
| 13 | compound 3 (10) | — | — | 3600 |
| 14 | compound 3 (10) | ZnO (5) | Ca stearate (5) | >4500 |
| 15 | compound 5 (10) | — | — | 3140 |
| 16 | compound 5 (10) | ZnO (5) | Ca stearate (5) | 4100 |
| 17 | compound 6 (10) | — | — | 3040 |
| 18 | compound 6 (10) | ZnO (5) | Ca stearate (5) | >4500 |

EXAMPLES 19-21

10 kg of linear low-density polyethylene (LLDPE) powder of melt index 0.9 (Dowlex 2045, a product from Dow Chemical) are mixed in a slow mixer with 2 g of pentaerythritol-tetrakis 3-(3,5-di-t-butyl-4-hydroxyphenyl)propionate], 8 g of tris-(2,4-di-t-butyl-phenyl)-phosphite and with the compounds indicated in Table 3.

The mixtures are then extruded to give stretched films of 150 μm thickness by blow extrusion using a Dolci pilot extruder (screw diameter=45/26D and head diameter=100 mm) under the following working conditions:

body temperature: 180-220—220° C.
head temperature: 220—220—220—220° C.

The films obtained are exposed outdoors at 45°, facing south, on pinewood at Pontecchio Marconi (Bologna) (about 110 kly/year). The residual elongation is measured on samples, taken after various times of exposure by means of a constant speed tensometer.

The energy received (express in Kilolangleys) needed to halve the initial elongation value is then calculated (T50). The results obtained are shown in Table 3.

TABLE 3

| Example No. | Compound A (g) | Compound B (g) | Compound C (g) | T50 elongation (Klys) |
|---|---|---|---|---|
| 19 | compound 1 (30) | — | — | 98 |
| 20 | compound 1 (30) | MgO (10) | — | 135 |
| 21 | compound 1 (30) | ZnO (10) | — | 127 |

What is claimed is:

1. A stabilized polyethylene composition which comprises
   (a) polyethylene, and
   (b) an effective light stabilizing amount of
      (A) one or more compounds containing a group of formula I

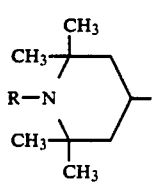

(I)

in which R is hydrogen, C1-C4-alkyl, allyl, benzyl, acetyl, acryloyl, 2-hydroxyethyl or 2-hydroxypropyl, and (B) one or more than one oxide or hydroxide of Al, Mg or Zn;

wherein the compound of component (A) is selected from the group consisting of the compounds of the formulae (II), (III), (IV), (X) and (XXI).

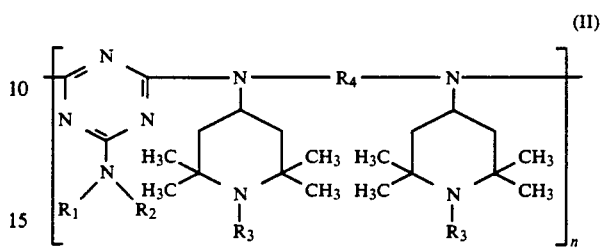

(II)

in which R1 is C1-C8-alkyl, cyclohexyl, 2,2,6,6-tetramethyl-4-piperidyl or 1,2,2,6,6-pentamethyl-4-piperidyl, R2 is hydrogen or C1-C8-alkyl, R3 is hydrogen or methyl, R4 is C2-C6-alkylene and n is a number from 2 to 20;

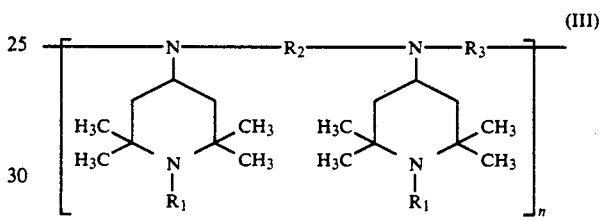

(III)

in which R1 is hydrogen or methyl, R2 is C2-C6-alkylene, R3 is C2-C6-alkylene, 2-hydroxytrimethylene or xylylene and n is a number from 2 to 20.

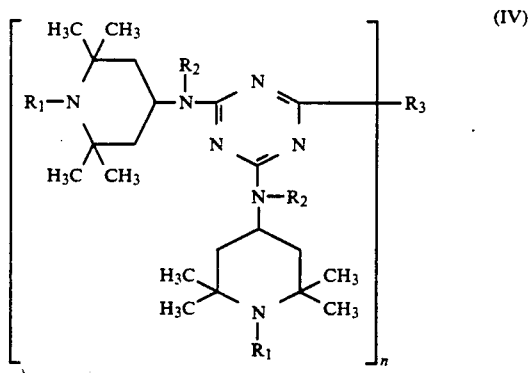

(IV)

in which R1 is hydrogen or methyl, R2 is hydrogen, C1-C8-alkyl, cyclohexyl, 2,2,6,6-tetramethyl-4-piperidyl or 1,2,2,6,6-pentamethyl-4-piperidyl, n is 2, 3 or 4 and R3 is the radical of an n-valent polyamine;

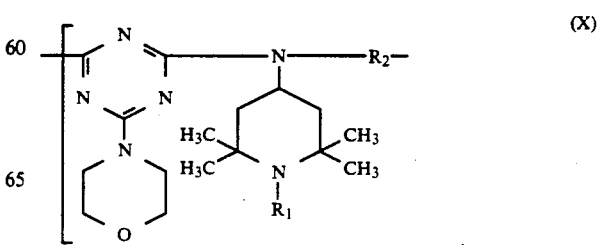

(X)

-continued

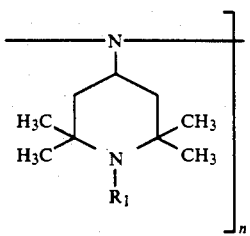

in which R₁ is hydrogen or methyl, R₂ is C₂-C₆-alkylene and n is a number from 2 to 20; and

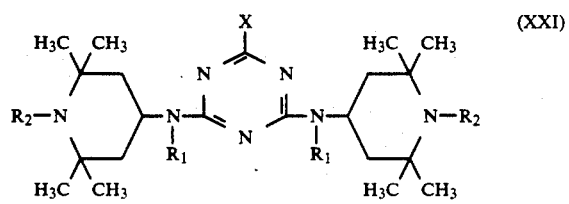
(XXI)

in which R₁ is C₁-C₈-alkyl, cyclohexyl, benzyl or C₂-C₄-alkyl substituted by C₁-C₄-alkoxy or dimethylamino or diethylamino, R₂ is hydrogen or methyl, X is morpholino or a group —NR₃R₄, —OR₅ or a group

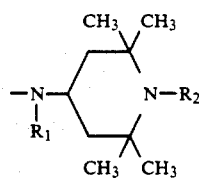

where R₃ and R₄ which can be identical or different are C₁-C₈-alkyl, cyclohexyl, benzyl or C₂-C₄-alkyl substituted of OH, C₁-C₄-alkoxy, dimethylamino or diethylamino, R₄ can also be hydrogen and R₅ is C₁-C₈-alkyl, allyl, cyclohexyl or benzyl.

2. A stabilized polyethylene composition comprising, in addition to compounds (A) and (B) of claim 1, (C) one or more salts of Al, Ba, Ca, Mg, Sr or Zn with a C₁-C₂₂carboxylic acid.

3. A stabilized composition according to claim 1, wherein the compound (A) corresponds to the formula (II) in which R₁ is C₂-C₈-alkyl or cyclohexyl, R₂ is hydrogen or C₂-C₈alkyl, R₅ is hydrogen or methyl, R₄ is —(CH₂)₂₋₆—and n is a number from 2 to 10.

4. A stabilized composition according to claim 1, wherein the compound (A) corresponds to the formula (III) in which R₁ is hydrogen or methyl, R₂ is —(CH₂-)₆—, R₃ is —(CH₂)₂₋₆— and n is a number from 2 to 10.

5. A stabilized composition according to claim 1, wherein the compound (A) corresponds to the formula (IV), in which R₁ is hydrogen or methyl, R₂ is C₁-C₄-alkyl, n is 2, 3, or 4, and R₃ is a group of the formula—NH(CH₂)₂₋₆NH— for n=2,

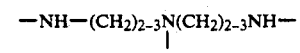

for n=3 and

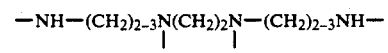

for n=4.

6. A stabilized composition according to claim 1, wherein the compound (A) corresponds to the formula (X), in which R₁ is hydrogen or methyl, R₂ is —(CH₂)₂₋₆—and n is a number from 2 to 10.

7. A stabilized composition according to claim 1, wherein the compound (A) corresponds to the formula (XXI), in which R₁ is C₁-C₈alkyl, R₂ is hydrogen or methyl and X is a group

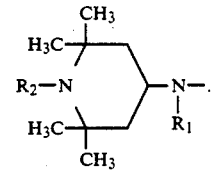

8. A stabilized composition according to claim 1, wherein the compound (A) is that of the formula

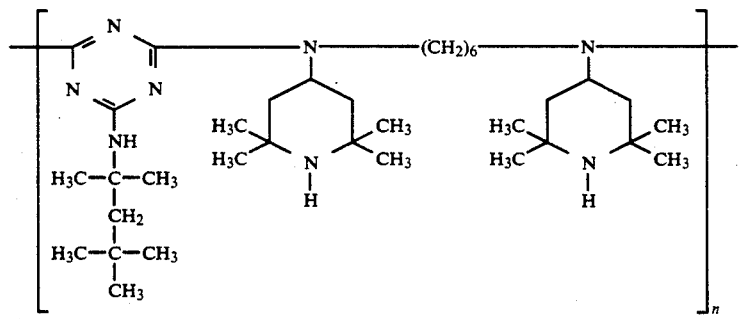

of a molecular weight between 2,000 and 4,000.

9. A stabilized composition according to claim 1, wherein the compound (A) is that of the formula 10. A stabilized composition according to claim 1, wherein the compound (A) is that of the formula

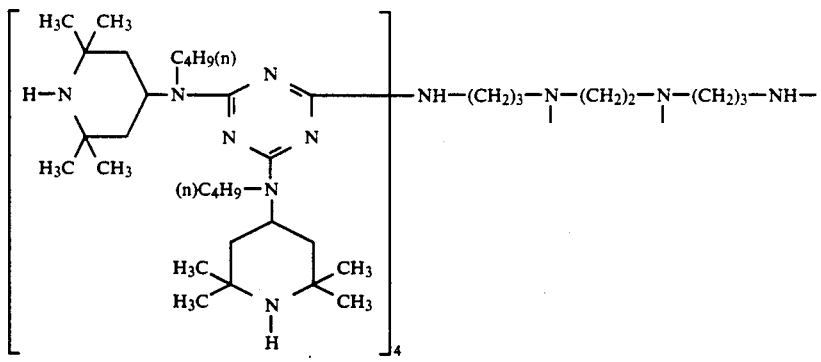

are: 0.025 to 2%, for compound (A) and 0.005 to 1%, for compound (B).

11. A stabilized composition according to claim 1, wherein the compound (A) is that of the formula

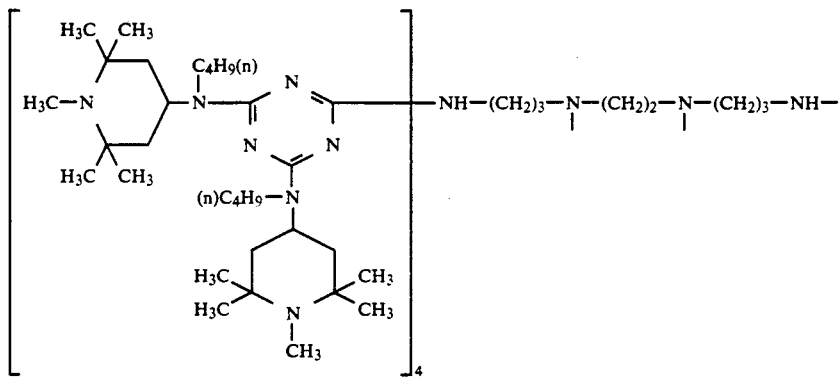

of a molecular weight between 2,000 and 4,000.

12. A stabilized composition according to claim 1, wherein the compound (B) is an oxide or hydroxide of Mg of Zn.

13. A stabilized composition according to claim 1, wherein the compound (B) is an oxide of Mg or Zn.

14. A stabilized composition according to claim 2, wherein the compound (C) is a salt of Al, Ca, Mg or Zn with $C_{12}-C_{18}$ carboxylic acid.

15. A stabilized composition according to claim 2, wherein the compound (C) is a salt of Ca, Mg or Zn with stearic acid.

16. A stabilized composition according to claim 1, wherein the percentages by weight relative to the weight of the polyethylene, of compounds (A) and (B)

17. A stabilized composition according to claim 2, wherein the percentage by weight relative to the poly-

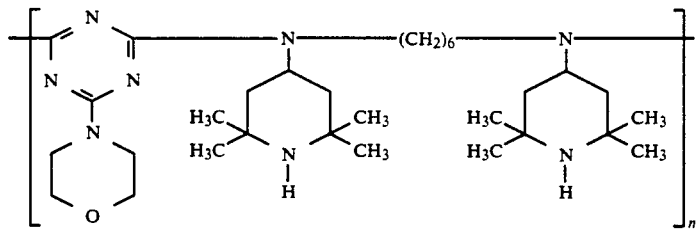

ethylene, of compound (C) is 0.005 to 1%.

18. A stabilized composition according to claim 1 wherein the polyethylene is low-density polyethylene (LDPE), linear low-density polyethylene (LLDPE) or a mixture thereof.

19. A film prepared from a stabilized polyethylene composition according to claim 1 wherein the polyethylene is low-density polyethylene (LDPE), linear low-density polyethylene (LLDPE) or a mixture thereof.

20. A film prepared from a stabilized polyethylene composition according to claim 2 wherein the polyethylene is low-density polyethylene (LDPE), linear low-density polyethylene (LLDPE) or a mixture thereof.

* * * * *